Oct. 2, 1962 P. L. ENNOR 3,056,205
DENTAL IMPRESSION TRAY
Filed March 2, 1959
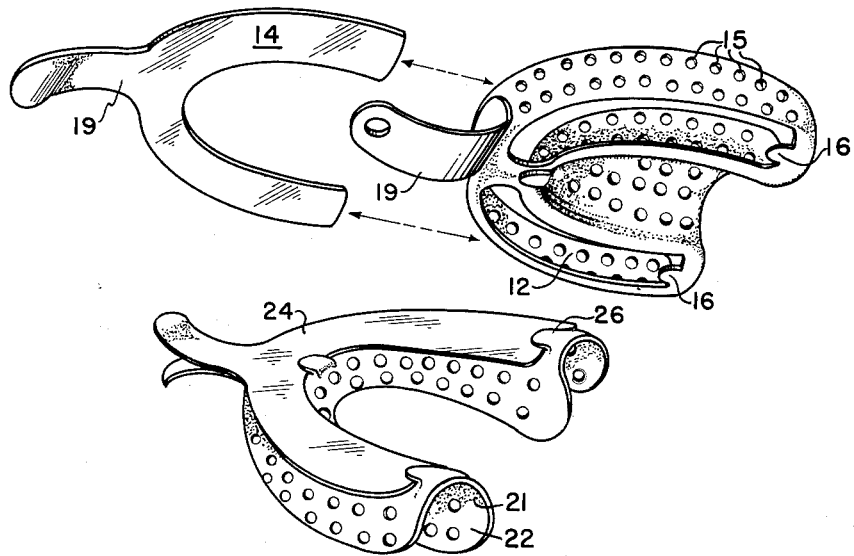
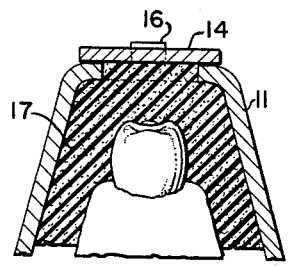
FIG. 2a
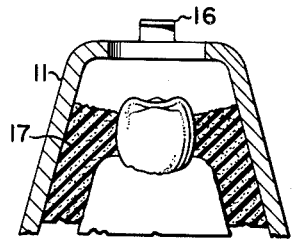
FIG. 2b
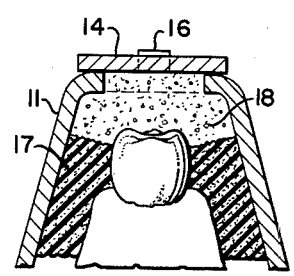
FIG. 2c
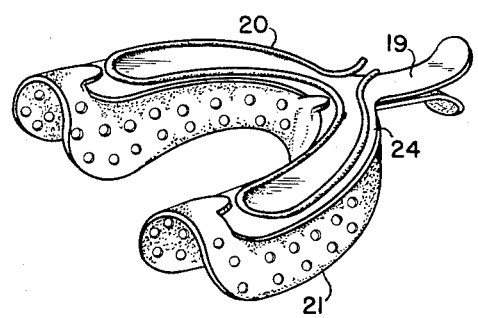
FIG. 3
INVENTOR.
PAUL L. ENNOR
BY
Walter J. Malbey Jr.
ATTORNEY _United States Patent Office_

3,056,205
Patented Oct. 2, 1962

3,056,205
DENTAL IMPRESSION TRAY
Paul L. Ennor, Lafayette, Calif., assignor to HEK Manufacturing Company, San Francisco, Calif., a corporation of California
Filed Mar. 2, 1959, Ser. No. 796,518
5 Claims. (Cl. 32—19)

The present invention relates in general to dental impression trays, and methods for their use, and relates more specifically to such trays in which a combination of an elastic-type impression material and a rigid-type material may be used in conjunction with each other for one impression.

In the construction and fitting of fixed abutments in dental work, such as full or partial crowns or inlays, it is desirable to have an accurate transfer impression of these in-place abutments in order to accurately complete the bridgework. Heretofore, the attainment of the desired accuracy in the transfer impression has been difficult or impossible, owing primarily to the fact that the elastic-type impression materials used lacked the rigidity necessary to permit the accurate fitting of the bridgework in the resulting impression. That is, the resilience of the resulting impression prevented the positive and firm mounting of the abutments on the impression.

Broadly, the present invention contemplates methods and apparatus for obtaining dental impressions to accurately reproduce mouth tissue and tooth contour by means of an elastic-type dental impression material, and to accurately reproduce the occlusal, lingual, libial, buccal and incisal areas of the teeth through the use of a rigid-type dental impression material. In accordance with the present invention, a composite impression is obtained utilizing both of these types of materials, and the composite impression may be made in essentially a single operation.

It is therefore an object of this invention to provide an improved method of obtaining dental impressions.

It is an additional object of the present invention to provide methods and apparatus for obtaining dental impressions in which the impression of the mouth tissue and tooth contour is obtained in an elastic-type material, and the impression of the configuration of the occlusal, lingual, buccal and incisal areas of the teeth is obtained in a rigid-type material.

It is a further object of this invention to provide methods and apparatus for obtaining dental impressions in which the impression of the mouth tissue and tooth contour is first obtained in an elastic-type material, and then an impression of the configuration of the occlusal, lingual, labial, buccal and incisal areas of the teeth is obtained with a rigid-type material.

Objects and advantages other than those set forth above will be apparent from the following description when read in connection with the accompany drawing, in which:

FIG. 1 is a perspective view, partly in section, illustrating upper and lower dental impression trays in accordance with the present invention;

FIGS. 2a, 2b and 2c are sectional views showing the progressive steps in obtaining a dental impression in accordance with the method of the present invention and utilizing the novel dental impression tray of this invention; and FIG. 3 is a perspective view illustrating an alternative embodiment of this invention in which means are provided to cool the impression material to hasten the setting thereof.

Referring to FIG. 1 by character of reference, numeral 11 designates the body portion of an upper tray member in accordance with the present invention. Body portion 11 is provided with an impressionable-material-receiving cavity or portion 12 which, as clearly shown in FIG. 1, corresponds generally to the curvature of the upper gum and tooth structure in the mouth. Both body 11 had cover 14 may be provided with handles 19 to facilitate their manipulation. Body 11 is preferably provided with perforations 15 over all or most of its area to permit the extrusion of excess impression material. The tray member is also provided with an occlusal or cover plate 14 which may be secured over the opening in the surface of body 11 which is opposite to the material-receiving cavity 12. That is, cover 14, when in place, serves as the bottom (or top) of cavity 12. Cover 14 may be held in place on body 11 by any suitable means, such as lugs 16. Cover 14 is removable or separable from body portion 11, as indicated in the drawing, to permit access to the impression material in cavity 12, as will be explained more in detail below.

The lower tray member illustrated in FIG. 1 is similar to the upper tray member, and includes a body portion 21 which is similar to body 11 except that it is not provided with the palate member which is necessary on the upper body member 11. The body 21 has an impressionable-material receiving cavity 22 for receiving the elastic impression material, and has a removable cover 24 which is held in position on body 21 by lugs 26.

The operation of the method and apparatus of the present invention can perhaps best be understood by reference to FIGS. 2a, 2b and 2c, which illustrate the progressive steps in obtaining an impression in accordance with this invention. The first step in obtaining the impression assuming the upper tray member is used is to fill the cavity 12 with an elastic-type impression material, with cover plate 14 in position on the body 11 and held in this position by lugs 16. Any suitable type of elastic impression material may be utilized, such as hydrocolloids, alginates, rubber base materials or silicon-base materials. The tray assembly, with the elastic material 17 therein, is then placed in the patient's mouth in position against the upper gum and teeth structure. The elastic material 17 conforms to the shape of the mouth tissue and tooth contour to provide a complete reproduction of this portion of the mouth. The excess elastic material 17 flows through openings or perforations 15. FIG. 2a illustrates this step of the technique, with elastic material 17 accurately reproducing the mouth tissue and tooth contour.

After the elastic material 17 has firmly set upon completion of this step of the impression-taking, cover plate 14 is removed to expose the portion of the elastic material over the occlusal surfaces of the teeth. This portion of the elastic material is then removed by any suitable cutting instrument to expose the occlusal tooth surfaces which are to be indexed in the rigid-type impression material. This step in the method is illustrated in FIG. 2b, which shows the occlusal tooth surfaces exposed by removal of this portion of elastic material 17, while the remainder of the elastic material remains in position.

The next step in the method is to cover the exposed occlusal tooth surfaces with a rigid-type impression material 18 which may be applied to these surfaces by a small spatula or other suitable instrument. Any suitable rigid-type elastic material may be utilized, such as plaster-of-Paris, gypsums, hydrocals, or pastes. After application of the rigid material 18 to the occlusal surfaces, cover plate 14 is replaced in position on body 11 and material 18 is allowed to set. This step is illustrated in FIG. 2c, showing cover plate 14 in position after applying the rigid material 18 to the occlusal surfaces.

After material 18 hardens, the entire tray assembly may be removed from the mouth. The tray contains the complete impressions, with the mouth tissue and tooth contour impression in elastic material 17 and the occlusal surface configuration in rigid material 18. The abutment crowns and/or inlays may then be positioned in the rigid impression formed by material 18, and the master cast for the denture may then be poured.

While the above description referred to the upper tray member, it will be understood that the operation of the invention will be similar for obtaining an impression of the lower mouth structure with the lower tray assembly. It will also be understood that the tray assemblies will be made available in a variety of different sizes to accommodate different size arches. In this connection, it will be seen that the structure of the tray body facilitates the selection of the proper tray size for a given patient. That is, with cover 14 or 24 removed and the tray body placed in the patient's mouth, substantially the entire tooth and tissue structure is readily visible to the dentist, thus facilitating the selection of the proper tray size and preventing the possibility of impression failure from improper tray selection.

In connection with some elastic impression materials, and particularly the hydrocolloid materials, it may be desirable to provide some cooling of the material to accelerate its setting. FIG. 3 illustrates one method of providing such cooling by means of the flow of a suitable liquid, such as ice water, through a length of piping 20 which is secured to tray cover 14. The open ends of conduit 20 may be connected to a source of such fluid, such as a cold or ice water supply generally available in most dental offices, to cool the elastic material in tray 11 by radiation and conduction.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The method of taking dental impressions comprising the steps of obtaining an impression of both the tooth and mouth tissue contour and the occlusal tooth surfaces with a resilient impression material, removing the portion of said resilient impression material around said occlusal surfaces, and obtaining an impression of said occlusal surfaces with a nonresilient impression material to provide a rigid impression of said occlusal surfaces and a resilient impression of said tooth and mouth tissue contour.

2. The method of taking dental impressions comprising the steps of obtaining an impression of both the tooth and mouth tissue contour and the occlusal tooth surfaces with a resilient impression material, removing the portion of said resilient impression material around said occlusal surfaces, obtaining an impression of said occlusal surfaces with a nonresilient impression material, and removing said resilient and said nonresilient materials from the mouth to produce a rigid impression of said occlusal surfaces and a resilient impression of said tooth and mouth tissue contour.

3. The method of taking dental impressions comprising the steps of obtaining an impression of both the tooth and mouth tissue contour and the occlusal tooth surfaces with a resilient impression material, cooling said resilient material to cause it to set up, removing the portion of said resilient impression material around said occlusal surfaces, and obtaining an impression of said occlusal surfaces with a nonresilient impression material to provide a rigid impression of said occlusal surfaces and a resilient impression of said tooth and mouth tissue contour.

4. Apparatus for obtaining dental impressions comprising a body member, said body member having walls defining a U-shaped cavity having the general configuration of the jaw surfaces to be measured, said cavity being adapted to receive a first dental impression material for obtaining an impression of the tooth and mouth tissue contour, and a removable cover plate secured to the bottom of said body member, said cover plate having a U-shape conforming generally to the shape of said cavity and covering substantially all of said cavity, removal of said cover plate exposing the portion of said first impression material corresponding to the occlusal tooth surfaces, whereby said occlusal portion of said first impression material may be removed by removal of said cover plate to obtain an impression of said occlusal surfaces in a second impression material.

5. Apparatus in accordance with claim 4 including conduit means in said body member for supplying a cooling fluid to cool said first impression material.

References Cited in the file of this patent

UNITED STATES PATENTS

| | | |
|---|---|---|
| 765,919 | Gibbs | July 26, 1904 |
| 1,812,008 | Lace | June 30, 1931 |
| 2,036,735 | Welker | Apr. 7, 1936 |
| 2,529,429 | Spiro | Nov. 7, 1950 |
| 2,685,137 | Thompson | Aug. 3, 1954 |
| 2,891,311 | Wood | June 23, 1959 |